US008275913B2

(12) United States Patent
Blachman et al.

(10) Patent No.: US 8,275,913 B2
(45) Date of Patent: Sep. 25, 2012

(54) METHOD AND SYSTEM FOR DETECTING STATE OF FIELD ASSET USING PACKET CAPTURE AGENT

(75) Inventors: Steven Joel Blachman, Pflugerville, TX (US); Jon Sven Knudson, Austin, TX (US)

(73) Assignee: Crane Merchandising Systems, Inc., Bridgeton, MO (US)

( * ) Notice: Subject to any disclaimer, the term of this patent is extended or adjusted under 35 U.S.C. 154(b) by 627 days.

(21) Appl. No.: 12/179,881

(22) Filed: Jul. 25, 2008

(65) Prior Publication Data

US 2010/0023651 A1 Jan. 28, 2010

(51) Int. Cl.
*G06F 3/00* (2006.01)
*G06F 13/00* (2006.01)

(52) U.S. Cl. .................. 710/8; 710/15; 710/18; 710/36; 710/58

(58) Field of Classification Search ........................ None
See application file for complete search history.

(56) References Cited

U.S. PATENT DOCUMENTS

2003/0074106 A1* 4/2003 Butler .......................... 700/236
2007/0050465 A1* 3/2007 Canter et al. ................. 709/209

OTHER PUBLICATIONS

Office Action dated Nov. 15, 2010 in connection with U.S. Appl. No. 11/299,607.

* cited by examiner

*Primary Examiner* — Scott Sun

(57) ABSTRACT

Methods and systems for detecting a state of a field asset using a packet capture agent is disclosed. A method may include capturing one or more packets transmitted on a shared bus in a field asset and determining the occurrence of a door event based at least one the one or more captured packets.

21 Claims, 3 Drawing Sheets

METHOD AND SYSTEM FOR DETECTING STATE OF FIELD ASSET USING PACKET CAPTURE AGENT

RELATED APPLICATIONS

This application is related to co-pending application Ser. No. 11/464,127, filed Aug. 11, 2006 and hereby incorporated by reference, which is a Continuation-In-Part of application Ser. No. 10/722,954, filed Nov. 26, 2003 and hereby incorporated by reference, which claims the benefit of Provisional Application No. 60/429,756, filed Nov. 27, 2002 and Provisional Application No. 60/480,626, filed Jun. 23, 2003, and which is a Continuation-In-Part of application Ser. No. 09/971,170, filed Oct. 4, 2001, which is a Continuation-in-Part of application Ser. No. 09/267,254, filed Mar. 12, 1999 (now U.S. Pat. No. 6,457,038), which claims the benefit of Provisional Application No. 60/078,645, filed Mar. 19, 1998 and Provisional Application No. 60/099,434, filed Sep. 8, 1998.

TECHNICAL FIELD

The present invention relates in general to the field of machine to machine (M2M) technology and, more particularly, the architecture of remote or field assets in an M2M environment.

BACKGROUND OF THE INVENTION

Machine to machine (M2M) technology refers generally to the ability of machines, devices, and assets, particularly those that are distributed or remote, to exchange information with people and/or with a corporate management system. Although a precise definition of M2M is difficult to formulate, M2M generally encompasses the use of telemetry via networks including, but not limited to, public wireless networks.

Historically, telemetry systems were limited to applications for conglomerates and other well-financed organizations. Large oil and gas companies and electric utilities, through the use of extensive customer built dedicated data networks, were among the first private organizations to use telemetry widely. More recently, however, the cost of access to public wireless data networks has been dropping while the capabilities of these networks has been increasing thus making M2M concepts feasible for a much larger audience.

The M2M systems described herein generally include remotely located machines or devices referred to as field assets. Although field assets may encompass any variety of specific types of machines (oil rigs, cellular phone system base stations, ATM machines, and weather monitors), the specific embodiments described herein are in the field of vending machines. Vending machines are unmanned, electromechanical devices that dispense products including consumable products such as soft drinks and snack foods in exchange for cash or other form of payment. Vending machines are generally deployed as remotely located field assets by a company that manages a plurality of such devices.

In the field of vending machines, the traditional extent of automation consisted primarily of the ability retrieve "snapshots" of inventory data from a vending machine using a wired, handheld device and a specialized, industry standard, data exchange (DEX) protocol and interconnect. DEX is a communication protocol for the electronic retrieval of machine-level transactions via data polling. While DEX has served its purpose well for a considerable period of time, DEX is not capable of analyzing vending machine sales beyond the most superficial level. Nor is DEX capable of providing information that could be used to manage a vending machine from a maintenance perspective. Moreover, a DEX polling event effectively takes a vending machine off line, even if for only a short duration. This limitation prevents it from serving as a real time transaction monitoring protocol.

More recently, the Multi Drop Bus/Internal Communication Protocol (MDB/ICP or, more simply MDB) vending machine technology has evolved. MDB defines a bus interface and standard for electronically controlled vending machines. Unlike DEX, MDB provides a control mechanism and standard for the various peripheral devices typically encountered in a vending machine. Moreover, MDB supports a level of time stamping that enables insight into information that is potentially valuable to a vending machine company. Despite the opportunities for expanded functionality and data insight offered by MDB, conventional MDB compliant vending machines tend to utilize MDB merely as an interconnect between a VMC and one or more peripherals and, possibly, a source of DC power.

Nevertheless, some efforts have been devoted to adding functionality to conventional vending machines. For example, U.S. patent application Ser. No. 10/722,954, referred to above, describes a processor-based audit device having access to the MDB bus and to the VMC via a DEX port. Using this audit device, a vending machine can greatly improve the amount and quality of information concerning sales. If, for example, sales of a particular vending machine vary considerably from day to day and even within a day, conventional DEX polling, which might take place on a weekly basis, for example, will not be able to identify these variations and the inability to do so could result in lost sales opportunities. Using such an audit device, a vending machine can retrieve and store a plurality of DEX downloads together with information from which time stamps can be derived for each DEX download.

As another example, U.S. patent application Ser. No. 11/464,127, referred to above, describes systems and methods for using a MDB packet capture agent or snoop agent to extend the functionality of vending machines to encompass information that is outside the scope of DEX or to capture and enhance traditional DEX data without performing a DEX download. Capturing packets directly from the MDB serves a variety of purposes including, as examples, enabling feedback of field asset performance and customer behavior in real time, without requiring a DEX polling event, uncoupling field asset monitoring from the DEX standard, and facilitating the gathering of quantifiable, time-based consumer behavior data.

While the ability to snoop MDB data represents an advance a vending machine management, it would be still further desirable to use such captured MDB data to determine operational parameters associated with the vending machine. For example, it would be beneficial to monitor when a door to the vending machine is opened and closed. Monitoring when a door is opened and closed may allow a vending machine owner to have a detailed record of when a vending machine is accessed, for example, to permit a vending machine operator to determine if the vending machine has been accessed without authorization. Under traditional approaches, an electronic door switch is electronically coupled to a vending machine controller and communicates signals to the vending machine controller indicating when the door is opened and closed. However, in these traditional approaches, the signals from the door switch are not communicated over either of the DEX or MDB busses of a vending machine, and thus are difficult to log without adding additional hardware and design complexity. One traditional solution to this problem has been to equip the vending machine with a second electronic door switch that is coupled to either of the DEX or MDB busses of the vending machine. However, this solution requires additional design complexity and cost.

SUMMARY OF THE INVENTION

In accordance with teachings of the present disclosure, disadvantages and problems associated with monitoring a field asset, in particular a vending machine, may be reduced or eliminated.

In accordance with one embodiment of the present disclosure, a method for determining an occurrence of a door event associated with a field asset is provided. The method may include capturing one or more packets transmitted on a shared bus in a field asset and determining the occurrence of a door event based at least one the one or more captured packets.

In accordance with another embodiment of the present disclosure, a field asset suitable for use in a machine to machine environment may include a machine controller, one or more slave peripheral devices, a snoop agent, and a device. The machine controller may be configured to function as a master of a shared bus. The one or more slave peripheral devices may be coupled to the bus, and the machine controller may transmit packets to the peripheral devices via the shared bus. The snoop agent may be configured to capture packets transmitted on the shared bus. The device may be operable to determine the occurrence of a door event based on the captured packets.

In accordance with a further embodiment of the present disclosure, a system may include a field asset. The field asset may include a machine controller, one or more slave peripheral devices, a snoop agent, and a device. The machine controller may be configured to function as a master of a shared bus. The one or more slave peripheral devices may be coupled to the bus, and the machine controller may transmit packets to the peripheral devices via the shared bus. The snoop agent may be configured to capture packets transmitted on the shared bus. The device may be operable to determine the occurrence of a door event based on the captured packets.

Other technical advantages will be apparent to those of ordinary skill in the art in view of the following specification, claims, and drawings.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Figure 1:
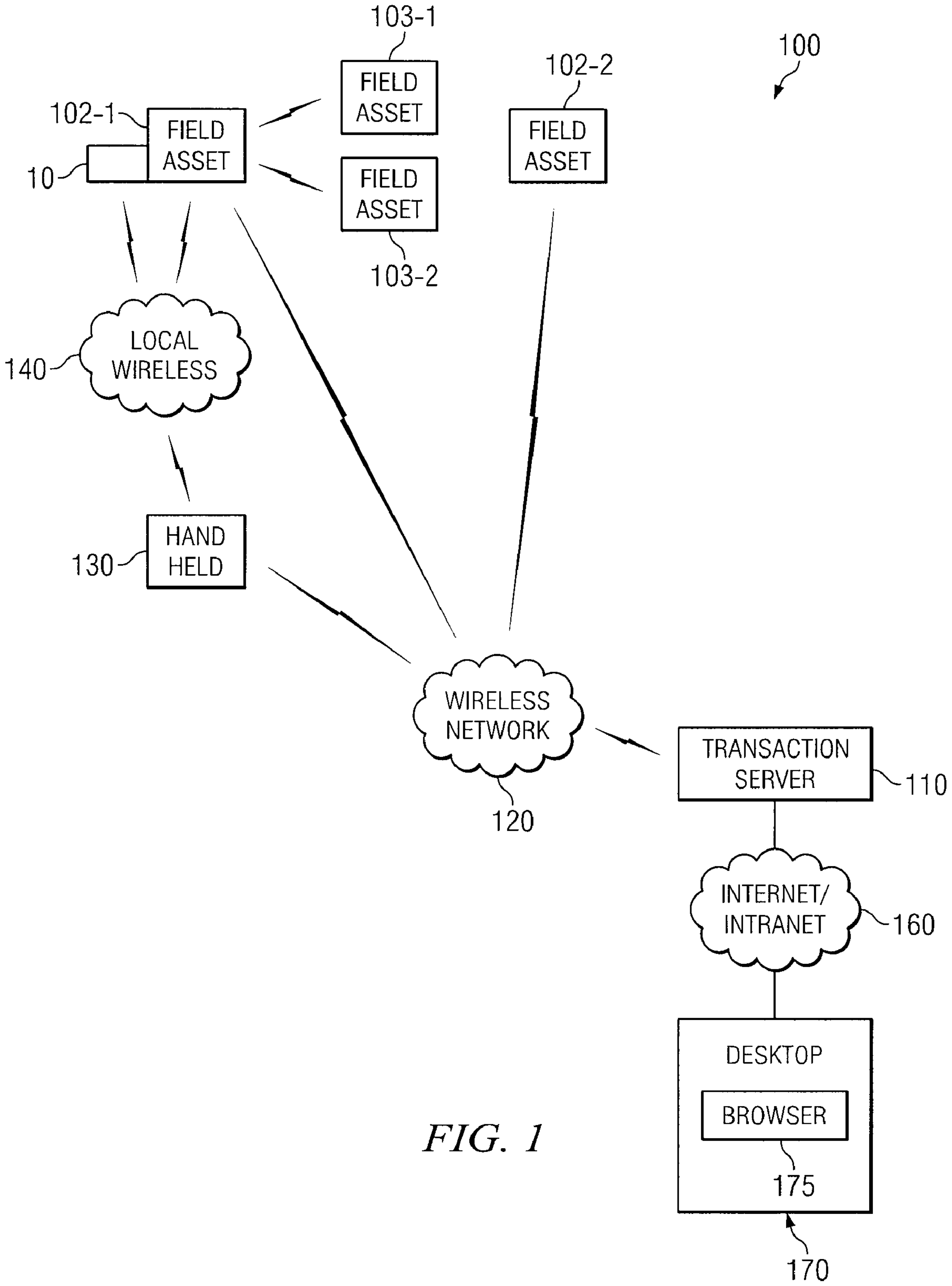
FIG. 1 depicts a block diagram of selected elements of an example machine to machine application including a plurality of remotely located field assets.
Figure 2:
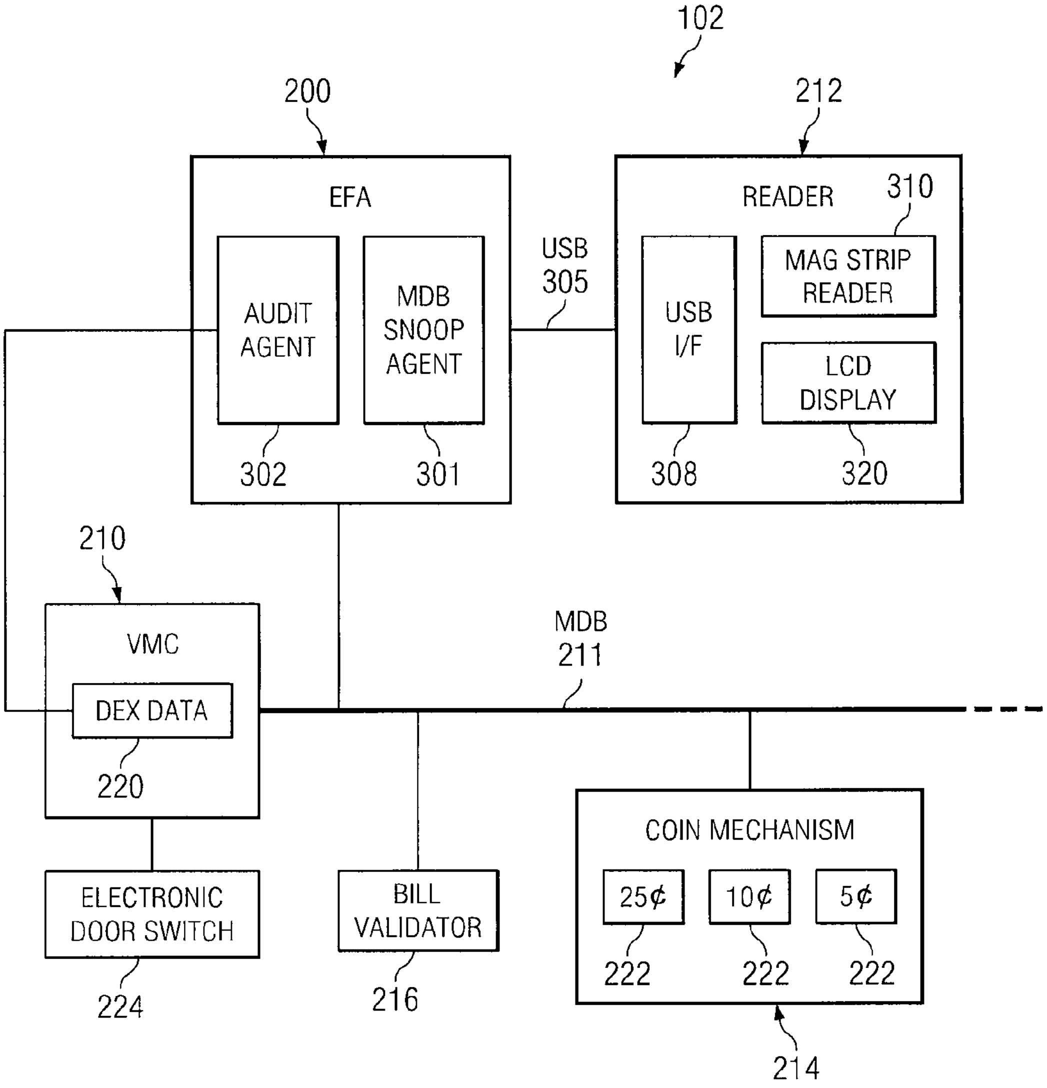
FIG. 2 depicts and example block diagram of selected elements of a field asset of FIG. 1 emphasizing the field asset's multi drop bus architecture and selected peripheral devices.
Figure 3:
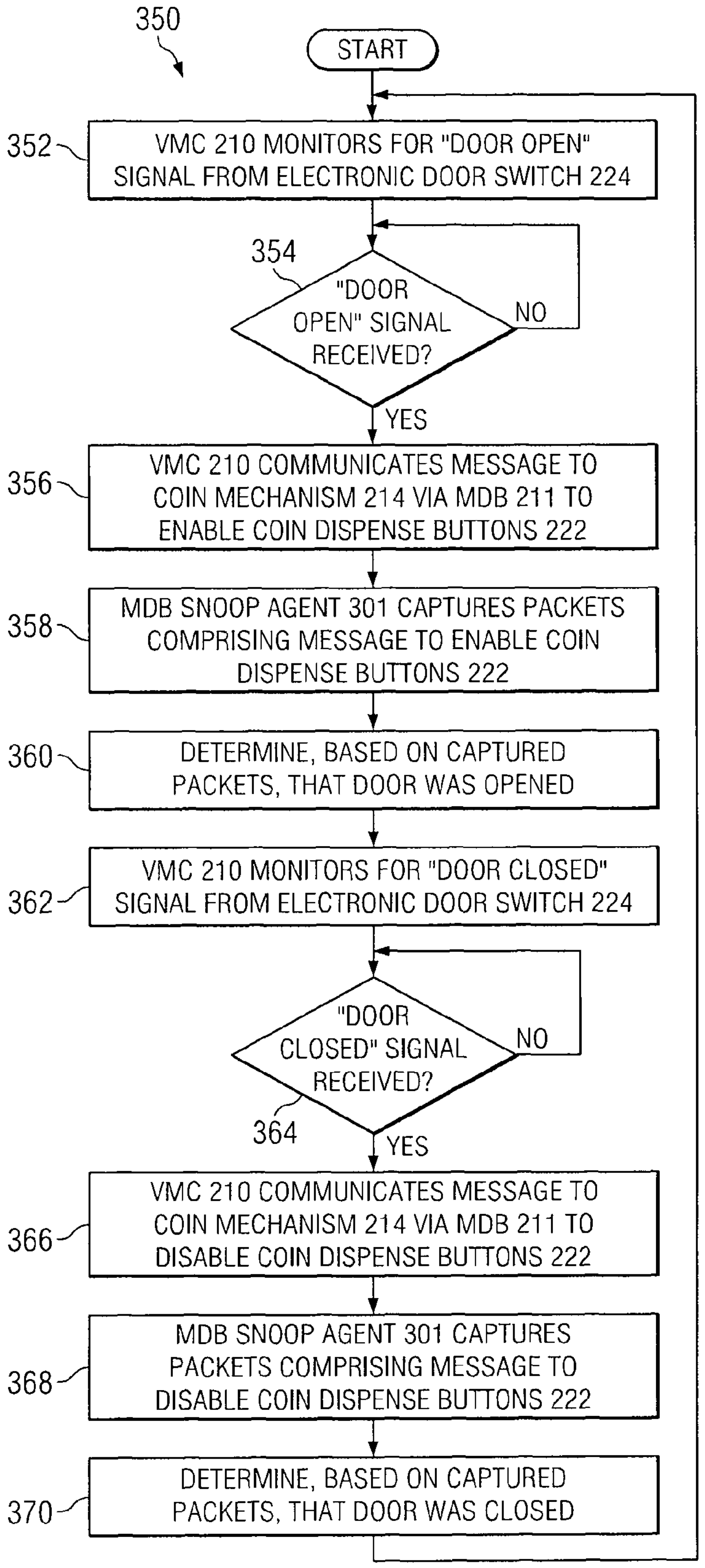
FIG. 3 depicts an example method for monitoring the door status of a field asset based on packets captured from a multi drop bus.

Preferred embodiments of the invention and its advantages are best understood by reference to FIG. 1 through FIG. 3, wherein like numerals indicate like and corresponding parts of the invention. Where different instances of a particular element are shown, they may be numbered with hyphenated reference numerals to indicate a common design or functionality. For example, elements 102-1 and 102-2 may be instances of a generic 102 element.

In one aspect, a machine to machine (M2M) network for remote field assets is described. M2M network 100 may include a collection of remotely located field assets 102, 103 in communication with a transaction processing server 110. Transaction processing server 110 may communicate with a field asset 102 via a wide area wireless network or via local wireless networks using a handheld data processing device or another suitable apparatus as an intermediary. Some field assets, including field assets 103, may lack wireless WAN connectivity and may, therefore, communicate with transaction processing server 110 through an intermediate field asset such as field asset 102-1.

Field assets 102 and 103 are exemplified by vending machines in which transactions likely include the sale of consumer goods stocked in the vending machine. In some embodiments, field asset 102 or 103 is an MDB compliant vending machine that includes a vending machine controller (VMC) as the master of an industry standard MDB bus to which one or more peripheral devices are coupled. In addition to conventional peripheral devices such as bill validators and coin mechanisms, a field asset may include hardware, firmware, and/or software that implements a platform for providing value added functionality to the vending machine or other field asset. This collection of hardware, software, and/or firmware is referred to herein as an extended function adapter (EFA).

The EFA supports one or more beneficial capabilities that facilitate automated vending machine management. An area of EFA functionality of special interest is an MDB offload engine (MOE) to capture and buffer or otherwise store packets on the MDB. In some embodiments, the EFA integrates two or more distinct extended function features. The EFA may, for example, include an audit agent that includes the capacity to perform DEX polling and to store and time stamp the captured DEX data structures.

Referring now to the drawings, FIG. 1 depicts a block diagram of selected elements of an example embodiment of an M2M network 100 including one or more field assets, examples of which are depicted as field assets 102-1 and 102-2 (generically or collectively referred to herein as field asset(s) 102) and field assets 103-1 and 103-2. Field assets 102 are depicted in FIG. 1 as being operable to communicate with a transaction server 110. Field assets 102 may be any set of machines or devices, typically having similar functionality, that are remotely distributed and capable of engaging in some form of transaction. Examples of field assets include vending machines, oil rigs, cellular phone system base stations, ATM machines, and weather monitors.

The packet capture features are described herein in the context of a vending machine class of field assets. Vending machines are ubiquitous machines historically used as an unmanned source of perishable and nonperishable consumer products including canned and bottled drink products, snack foods, and so forth. Details of one embodiment of a field asset are described below with respect to FIG. 2.

In the embodiment depicted in FIG. 1, field assets 102 and 103 may communicate with transaction server 110 wirelessly via alternative communication paths. Field asset 102-2 is depicted as connecting "directly" to transaction server 110 via a wireless medium and wireless network 120. Wireless network 120 may employ wireless cellular technology including the well known use of multiple base stations positioned in specified locations to communicate wireless signals across a wide geographic area.

Field asset 102-1 is depicted as being capable of communicating wirelessly with a handheld device 130 via a local wireless network 140 or directly with transaction processing server 110 via wireless network 120. Field assets 103 may communicate locally with field asset 102-1 and use field asset 102-1 to act as a relay station for information from devices 103-1 and 103-2.

The handheld device 130 is shown as connecting to transaction server 110 using wireless network 120, sometimes referred to herein as global wireless network to distinguish local wireless network 140. Local wireless network 140 may be implemented using any of a variety of short range wireless technologies including as perhaps the most prominent examples, Bluetooth and WiFi (e.g., IEEE 802.11b, IEEE 802.11g, and their derivatives).

In the case of local wireless communication, an operator may convey handheld device 130 to a location that is in close proximity to a field asset 102. The field asset 102 and handheld device 130 may establish a local wireless signal enabling communication between the two. After establishing a local wireless communication channel, field asset 102 and handheld device 130 may exchange data or information. Field asset 102 may, as an example, transmit sales transaction information to handheld device 130.

Handheld device 130 may then convey the information it has received from field asset 102 to transaction server 110 via wireless network 120. Alternatively, transfer of information from field asset 102-1 to transaction server 110 may be achieved by transferring the data from field asset 102-1 to handheld device 130 using local wireless network 140, transporting handheld device 130 to a location in proximity to transaction server 110, and transmitting the information in handheld device 130 to interaction server 110 via another local wireless (not depicted) transfer. In still another alternative, information may be passed from field asset 102-1 to handheld device 130 and/or from handheld device 130 to transaction server 110 using a cable or other wired connection, possibly to enhance the security of confidential information.

Transaction server 110 may be implemented as a set of one or more server class computers operable to process many transactions. Transaction server 110 may include, as an example, a database management application (e.g., Oracle, DB2, etc.)

A desktop data processing system 170 is depicted in FIG. 1 as being coupled to transaction server 110 via the Internet or intranet represented by reference numeral 160. Desktop data processing system 170 may include a processor, memory, and/or I/O peripherals according to any of various well known desktop designs. Desktop data processing system 170 may include an operating system (OS) and a conventional web browsing application represented by reference numeral 175.

As depicted in FIG. 1, M2M network 100 may include various components that facilitate high volume transaction processing in a remotely distributed architecture that includes wireless communication elements, which may be characterized by relatively unreliable or unstable communication paths to all or some of the remote assets. The elements of M2M network 100 may include (1) remote communication facilities to communicate with remote assets over multiple forms of wireless networks, (2) handheld technology suitable for mobile access to the field assets and to a transaction server, (3) server software for processing volumes of transactions, and (4) browser-based access (or access via another network capable application) to useful information provided by transaction server 110. Although not depicted explicitly in FIG. 1, value added facilities in field assets 102 and 103 may include an expandable, PC industry standard communication interface to legacy equipment. The EFA serves may this last function and is described in greater detail below. In the preferred embodiment, the EFA provides a platform for interfacing to archaic or otherwise unique protocols such as Data Exchange (DEX) and Multi Drop Bus (MDB) commonly encountered in remote field asset applications and especially in the vending machine industry.

The type of information conveyed or otherwise exchanged between field assets 102 and transaction server 110 may vary depending upon the manner in which and the purpose for which field asset 102 is implemented, but the information most likely includes information about transactions that occur or have occurred using field assets 102. The transaction information referred to can include, as examples, information about when a transaction occurs and other transaction details, for example, what product or combination of products were purchased, what consumer or customer purchased the product (if known), the dollar amount of the purchase, the amount of time required to complete the purchase, the manner of payment, and other information that may be useful to vending machine operators and/or the providers of goods sold through field assets 102.

Referring now to FIG. 2, an embodiment of an example field asset 102 is shown. While the elements of FIG. 2 are applicable to field assets 103 of FIG. 1, the remainder of the discussion will use reference numeral 102 exclusively for the sake of simplicity. In the depicted embodiment, field asset 102 may be an MDB compliant machine or device that includes a VMC 210 coupled to an MDB 211, to which a plurality of peripheral devices are coupled.

As shown in FIG. 2, field asset 102 may have one or more peripheral devices including a coin mechanism 214, a bill validator 216, and a card reader 212. As depicted in FIG. 2, coin mechanism 214 may include one or more coin dispense buttons 222. These peripheral devices may be well-known devices in the field of vending machines generally and MDB compliant vending machines in particular. As implemented in FIG. 2, coin mechanism 214 and bill validator 216 may be coupled directly to MDB 211 while card reader 212 is shown as connecting to MDB 211 using extended function adapter (EFA) 200 as an intermediary. In the depicted embodiment, card reader 212 connects to EFA 200 via a Universal Serial Bus (USB) connection 305. Card reader 212 is shown as including a magnetic strip reader 310, a Liquid Crystal Display (LCD) display 320, and a USB Interface 308, providing access to USB connection 308.

In addition, field asset 102 may include an electronic door switch 224. Electronic door switch 224 may be any suitable system, device or apparatus to detect when a door, lid, or other closure mechanism (all of which will be referred to herein as a "door" for purposes of simplicity) of field asset 102 is opened and/or closed, and communicate such door status to VMC 210.

MDB 211 may be compliant with the Multi Drop Bus/Internal Communication Protocol (the MDB protocol) maintained by the National Automatic Marketing Association (NAMA). The MDB protocol is an interface standard that allows the various components of a vending machine to communicate to VMC 210. The MDB protocol determines the way in which VMC 210 learns what coins were accepted by coin mechanism 214, what bills were accepted by bill validator 216, and how much credit is available through card reader 212. The MDB protocol may also allow MDB 210 to communicate commands, instructions, or other information to peripherals coupled thereto. For example, the MDB protocol may allow VMC 210 to "tell" coin mechanism 214 how much change to pay out or to "tell" the card reader 212 how much credit to return to the card.

Unlike many shared bus protocols, the MDB protocol may define VMC 210 as the one and only master of MDB 211 and all other peripherals as slaves. VMC 210 may address packets to any of the peripheral devices, but peripheral devices cannot communicate with each other and only transmit packets to VMC 210 in response to receiving a packet from the VMC 210. Also, as suggested previously, MDB is a polling-based protocol. A significant percentage of MDB traffic consists of polling packets issued by VMC 210 and acknowledge packets from the peripheral devices. In most shared bus architectures, e.g., Ethernet and PCI, devices can act as masters or slaves and polling is not an inherent feature of the architecture.

EFA 200, as its name suggests, includes application extensions that enhance the features of field asset 200. In conjunction with VMC 210, EFA 200 may include an audit agent 302 suitable for retrieving DEX data 220 from VMC 210. In addition, the depicted embodiment of EFA 200 may also include an MDB snoop agent 301 enabled to capture and buffer or otherwise store MDB packets.

The ability to capture MDB packets may enable variety of different applications. MDB packet traffic may be captured and analyzed to achieve time-based and DEX independent auditing capabilities. As another example, MDB packet traffic can also be used to monitor system health and/or other parameters associated with field asset 102.

The elements of EFA 200 depicted in FIG. 2 include an MDB snoop agent 301 and an audit agent 302. Audit agent 302 may interact with VMC 210, typically through a conventional RS-232 link, to retrieve or poll DEX data 220 from VMC 210. EFA 200 may be programmed to poll DEX data 220 multiple times each day and to store the data for each such polling event and the time associated with each event. In this manner, audit agent 302 can create a dynamic view of DEX data. Audit agent 302 may also audit other aspects of field asset 102 including, for example, information captured by MDB snoop agent 301.

MDB snoop agent 301 may include hardware, software, and/or firmware support to capture MDB packets as they appear on MDB 211 and provide them to an audit engine or application for further study. In one embodiment, MDB snoop agent 301 and/or EFA 300 may be implemented as detailed in U.S. patent application Ser. No. 11/464,127, referred to above. Accordingly, MDB snoop agent 301 may be enabled to capture all MDB packets both to and from VMC 210 and transmit them to embedded processor EFA 200 for further handling. Based at least on such captured MDB packets, EFA 200 may implement analysis applications to determine and/or monitoring the health and status of field asset peripheral devices and MDB 211.

Among the parameters of field asset 102 that may be determined and/or monitored by capturing MDB packets is the status (e.g., open or closed) of a door affixed to field asset 102. As discussed above, a door switch, for example electronic door switch 224, may communicate the door status to VMC 210. However, as also discussed above, traditional approaches do not often allow such door status signals to be easily monitored and/or recorded, because such signals are typically not communicated over the DEX or MDB busses. Nonetheless, using a method similar or identical to that set forth in FIG. 3, the door status of field asset 102 may be determined and/or recorded without the need to directly sense or record signals communicated from electronic door switch 224 to VMC 210.

FIG. 3 depicts an example method 350 for monitoring the door status of a field asset based on packets captured from MDB 211. According to one embodiment, method 350 may begin at step 352 with a door of a field asset (e.g. field asset 102) closed. In another embodiment, method 350 may begin at step 362 with the door open. As noted above, teachings of the present disclosure may be implemented in a variety of configurations of M2M network 100 and/or field asset 102. As such, the preferred initialization point for method 350 and the order of the steps 352-370 comprising method 350 may depend on the implementation chosen.

At step 352, VMC 210 may monitor for a signal from electronic door switch 224 indicating that the door of field asset 102 has been opened. At step 354, VMC 210 may determine whether the "door open" signal from electronic switch 224 has been received. If the door open signal is received, method 350 may proceed to step 356. Otherwise, if the door open signal is not received, method 350 may remain at step 354. The door may be opened in connection with an authorized service visit by a service technician, or may be opened in connection with an unauthorized access (e.g., unauthorized access by a technician, attempted theft, vandalism, etc.).

Pursuant to at least one electronic vending standard/specification, coin dispense buttons 222 are to be enabled when the door to field asset 102 is opened. Accordingly, at step 356, in response to receipt of the "door open" signal, VMC 210 may communicate a message to coin mechanism 214 via MDB 211 to enable coin dispense buttons 222. At step 358, MDB snoop agent 201 may capture packets comprising the message to enable coin dispense buttons 222 as such message is communicated via MDB 211.

At step 360, MDB snoop agent 301, audit agent 302, an embedded processor associated with field asset 102, and/or another component of M2M network 100 may determine, based at least on the captured packets, that the door was opened. In certain embodiments, the determination that the door was opened may be recorded and/or logged for future reference. In the same or alternative embodiments, a time stamp and/or information regarding the time and/or duration of the opening of the door may also be recorded and/or logged. Such recording and/or logging may performed by any suitable component of M2M network 100, including without limitation, MDB snoop agent 301, audit agent 302, desktop data processing system 170, transaction server 110, and/or an embedded processor associated with field asset 102.

At step 362, VMC 210 may monitor for a signal from electronic door switch 224 indicating that the door of field asset 102 has been closed. At step 364, VMC 210 may determine whether the "door closed" signal from electronic switch 224 has been received. If the door closed signal is received, method 350 may proceed to step 366. Otherwise, if the door closed signal is not received, method 350 may remain at step 364. The door may be closed after being opened in connection with an authorized service visit by a service technician, or may be closed after being opened in connection with an unauthorized access (e.g., unauthorized access by a technician, attempted theft, vandalism, etc.).

Pursuant to at least one electronic vending standard/specification, coin dispense buttons 222 are to be disabled when the door to field asset 102 is closed. Accordingly, at step 366, in response to receipt of the "door closed" signal, VMC 210 may communicate a message to coin mechanism 214 via MDB 211 to disable coin dispense buttons 222. At step 368, MDB snoop agent 201 may capture packets comprising the message to disable coin dispense buttons 222 as such message is communicated via MDB 211.

At step 370, MDB snoop agent 301, audit agent 302, an embedded processor associated with field asset 102, or another component of M2M network 100 may determine, based at least on the captured packets, that the door was closed. In certain embodiments, the determination that the door was closed may be recorded and/or logged for future reference. In the same or alternative embodiments, a time stamp and/or information regarding the time and/or duration of the closure of the door may also be recorded and/or logged. Such recording and/or logging may performed by any suitable component of M2M network 100, including without limitation, MDB snoop agent 301, audit agent 302, desktop data processing system 170, transaction server 110, and/or an embedded processor associated with field asset 102.

Although FIG. 3 discloses a particular number of steps to be taken with respect to method 350, it is understood that method 350 may be executed with greater or lesser steps than those depicted in FIG. 3. In addition, although FIG. 3 discloses a certain order of steps to be taken with respect to method 350, the steps comprising method 350 may be completed in any suitable order. Method 350 may be implemented using M2M network 100, field asset 102 or any other system operable to implement method 350. In certain embodiments, method 300 may be implemented partially or fully in software embodied in tangible computer-readable media.

Accordingly, using methods similar or identical to those set forth in FIG. 3, the MDB snoop agent 301 may be leveraged to determine and/or record when a field asset door is opened and closed, and the duration or opening of closing without the addition of another door switch or other associated hardware based at least on the presence of commands on MDB 211 to enable and/or disable status coin dispense buttons 222.

Although the present invention has been described with respect to a specific preferred embodiment thereof, various changes and modifications may be suggested to one skilled in the art and it is intended that the present invention encompass such changes and modifications fall within the scope of the appended claims.

What is claimed is:

1. A method, comprising:

capturing one or more packets transmitted on a shared bus from a machine controller to at least one payment device in a field asset; and based on one or more captured packets relating to communications between the machine controller and the at least one payment device, determining the occurrence of a service door event within the field asset.

2. A method according to claim 1, wherein the service door event includes at least one of an opening of the service door or a closing of the service door.

3. A method according to claim 2, further comprising determining at least one of:

a duration of time in which the service door is closed; and a duration of time in which the service door is open.

4. A method according to claim 1, wherein determining the occurrence of the service door event includes determining that the one or more captured packets include a message related to a coin mechanism coupled to the shared bus.

5. A method according to claim 4, wherein the message includes a command to enable one or more coin dispense buttons associated with the coin mechanism or a command to disable one or more coin dispense buttons associated with the coin mechanism.

6. A method according to claim 1, further including recording a time stamp associated with the door event.

7. A method according to claim 1, wherein the shared bus includes a multi-drop bus (MDB).

8. A field asset, comprising:

a machine controller configured to function as a master of a shared bus;

one or more payment devices coupled to the bus, wherein the machine controller transmits packets to at least one of the payment devices via the shared bus;

a snoop agent configured to capture packets transmitted on the shared bus; and a device operable to determine the occurrence of a service door event based on the captured packets relating to communications between the machine controller and the at least one payment device.

9. A field asset according to claim 8, wherein the service door event includes at least one of an opening of a service door or a closing of the service door.

10. A field asset according to claim 9, wherein the device is further operable to determine at least one of:

a duration of time in which the service door is closed; and a duration of time in which the service door is open.

11. A field asset according to claim 8, wherein the device is operable to determine the occurrence of the service door event by determining that the captured packets include a message related to a coin mechanism coupled to the shared bus.

12. A field asset according to claim 11, wherein the message includes a command from the machine controller to enable one or more coin dispense buttons associated with the coin mechanism or a command from the machine controller to disable one or more coin dispense buttons associated with the coin mechanism.

13. A field asset according to claim 8, wherein the device is further operable to record a time stamp associated with the door event.

14. A field asset according to claim 8, wherein the shared bus includes a multi-drop bus (MDB).

15. A field asset according to claim 8, wherein the device is selected from a group consisting of the machine controller, the snoop agent, and an embedded processor.

16. A system, comprising:

a field asset including:

a machine controller configured to function as a master of a shared bus;

one or more payment devices coupled to the bus, wherein the machine controller transmits packets to at least one of the payment devices via the shared bus;

a snoop agent configured to capture packets transmitted on the shared bus; and a device operable to determine the occurrence of a service door event based on captured packets relating to communications between the machine controller and the at least one payment device.

17. A system according to claim 16, wherein the service door event includes at least one of an opening of a service door or a closing of the service door.

18. A system according to claim 16, wherein the device is configured to determine the occurrence of a door event by determining that the captured packets include a message, the message comprising at least one of a command from the machine controller to enable one or more coin dispense buttons associated with a coin mechanism coupled to the bus and a command from the machine controller to disable one or more coin dispense buttons associated with the coin mechanism.

19. A system according to claim 16, wherein the shared bus includes a multi-drop bus (MDB).

20. A system according to claim 16, wherein the device is selected from a group consisting of a transaction server and a data processing system.

21. A system according to claim 16, wherein the device is selected from a group consisting of the machine controller, the snoop agent, and a processor embedded in the field asset.

* * * * *